United States Patent [19]

Shima et al.

[11] Patent Number: 5,609,799
[45] Date of Patent: Mar. 11, 1997

[54] PROCESS FOR PRODUCING CUPROUS OXIDE POWDER

[75] Inventors: Masao Shima; Katsuhiko Yaoita; Masaharu Nagahara, all of Ashio-machi; Hiroshi Kametani, Yokohama, all of Japan

[73] Assignee: Furukawa Co., Ltd., Tokyo, Japan

[21] Appl. No.: 337,938

[22] Filed: Nov. 10, 1994

[30] Foreign Application Priority Data

Sep. 19, 1994 [JP] Japan ................................. 6-223729

[51] Int. Cl.$^6$ ...................................................... B29B 9/10
[52] U.S. Cl. ................................................................ 264/12
[58] Field of Search ........................... 264/12, 11; 75/338, 75/339

[56] References Cited

U.S. PATENT DOCUMENTS

| | | | |
|---|---|---|---|
| 3,128,172 | 4/1964 | Wagner et al. | 75/339 |
| 3,765,866 | 10/1973 | Nayar | 75/339 |
| 3,814,558 | 6/1974 | Ayers | 264/11 |
| 4,339,401 | 7/1982 | Clark et al. | 264/11 |
| 4,770,718 | 9/1988 | Verhoeven et al. | 264/12 |

FOREIGN PATENT DOCUMENTS 5-815  1/1993  Japan.

Primary Examiner—Mary Lynn Theisen
Attorney, Agent, or Firm—Young & Basile, P.C.

[57] ABSTRACT

A cuprous oxide powder is produced by the steps of discharging a molten copper, which is kept at a temperature at or higher than the melting point and at or lower than 1450° C. and contained in a container having a nozzle at a bottom, from the nozzle into a reactor vessel disposed below the container to form a downward flow of the molten copper, atomizing the downward flow by a jet stream of an oxygen-contained gas and, thereby simultaneously, oxidizing the molten copper to form cuprous oxide, cooling liquid droplets or solid particles of the thus formed cuprous oxide and then collecting the droplets or particles from the reactor vessel. A cuprous oxide powder can be produced, without requiring a large-scale production facility, in simple steps, and efficiently and continuously.

5 Claims, 1 Drawing Sheet

PROCESS FOR PRODUCING CUPROUS OXIDE POWDER

BACKGROUND OF THE INVENTION

Field of the Invention and Related Statement

The present invention concerns a process for producing a cuprous oxide powder used, for example, as an a ship bottom paint, and, especially, as an antifouling pigment for ship bottoms.

For the production of cuprous oxide, the following methods have generally been known.

A. A method of mixing a copper powder and a copper suboxide ($Cu_2O$) hereinafter referred to as "cuprous oxide") powder, pressing and then heating the mixture in a tightly closed vessel at 100° C. and producing cuprous oxide by interaction.

B. A method of producing cuprous oxide by oxidizing a copper powder in an air flow by heating at 1,000° C.

C. A method of producing cuprous oxide by blowing oxygen enriched air into molten copper at 1240° C. or higher, separating cuprous oxide in a molten state based on the difference of specific gravity, solidifying and then mechanically pulverizing the same.

D. A method of producing cuprous oxide by electrolysis in a solution in which chlorine ions are present by using metal copper as an anode.

E. A method of producing cuprous oxide by reducing copper ions in a solution with sodium sulfite or the like.

F. A method of producing cuprous oxide by neutralizing a cuprous salt.

In the production methods for cuprous oxide described above, the methods A, B and C are dry production processes. However, the methods A and B have a drawback of requiring a long production time since a solid oxidizing reaction is utilized. In the method C, since oxygen enriched air is directly blown into the molten salt and copper is oxidized to form cuprous oxide, refractory materials of a furnace are abraded which deteriorates the purity of the products. In addition, cuprous oxide solidified from a solution at a high temperature and pulverized and further powderized into particles of about 10 μm size results in a remarkable drawback of requiring large-powderizing facilities.

Meanwhile, since the methods D, E and F adopt a production process for cuprous oxide by a wet process and an electrolytic process, control for each of the steps is difficult. Further, such a wet process has difficulty in obtaining cuprous oxide particles suitable to an antifouling pigment.

The present invention overcomes such problems in the production of a cuprous oxide powder and it is an object of the invention to provide a process capable of producing a cuprous oxide powder suitable to a ship bottom paint, for example, an antifouling pigment, without requiring a large-scaled production facility, by simple steps, and efficiently and continuously.

SUMMARY OF THE INVENTION

A process for producing a copper suboxide ($Cu_2O$), hereinafter referred to as "cuprous oxide") powder according to the present invention comprises the steps of:

discharging a molten copper, which is kept at a temperature at or higher than the melting point and at or lower than 1450° C. and contained in a container having a nozzle disposed at a bottom, from the nozzle into a reactor vessel disposed below the container to form a downward flow of the molten copper, atomizing the downward flow by a jet stream of an oxygen-contained gas and, thereby, simultaneously oxidizing the molten copper to form cuprous oxide, cooling liquid droplets or solid particles of the thus formed cuprous oxide, and then collecting the droplets or solid particles from the reactor vessel.

The molten copper may also be discharged from the nozzle to a direction other than the vertical direction thereby forming the downward flow of the molten copper. The oxygen-contained gas is preheated to a temperature between 300° C. and 1200° C. thereby controlling the reaction temperature. Further, a gas introduction port is disposed in the reaction vessel and an inert gas containing nitrogen is supplied through the gas introduction port thereby rapidly cooling the liquid droplets or solid particles of thus formed cuprous oxide and lowering the oxygen partial pressure to prevent excess oxidation into a copper oxide or cupric oxide (CuO).

Cuprous oxide is mainly used as an antifouling pigment in a paint for ship bottoms and generally used for the paint in the form of particles having diameters from several micronmeters to ten and several micronmeters.

According to the present invention, a jet stream of an oxygen-contained gas is used such that a molten copper flows downwardly in a central portion of the gas jet stream, by which the molten copper is scattered and atomized to form fine liquid droplets or fine particles and, simultaneously, oxidized to form cuprous oxide. Since the oxidizing reaction is conducted in a state where the surface area for oxidization is increased by atomizing the molten copper, cuprous oxide particles having a size ranging from several micronmeters to ten and several micronmeters can be produced continuously not by way of a powderization step.

The process for producing the cuprous oxide undergoes two restrictions.

One of them concerns the oxidation of metal copper. The oxidizing reaction is represented by the following formula (1):

$$4Cu+O_2=2Cu_2O \tag{1}$$

A theoretical amount of oxygen required for oxidizing, for example, 100 gm of metal copper is about 9 liters as pure oxygen or about 42 liters of air in a normal state. Unreacted metal copper remains if the amount of oxygen is insufficient, whereas excessive oxidation for cuprous oxide takes place in the course of cooling due to the concentration of residual oxygen if the amount of oxygen is excessive. Accordingly, it is necessary to adequately keep the oxygen partial pressure in the gas used for the atomizing reaction and the oxygen partial pressure in the gas remaining after the atomizing reaction.

The other of the restrictions concerns the size of particles formed by atomization. It is desirable that the diameter of the particles of the molten copper be less than 30 μm in order to rapidly complete the reaction in the downwarding course.

For the atomization of the molten metal, a gas atomizing process using an inert gas is well-known and many technical literatures describe the relationship between the atomizing conditions and the particle size of the resultant metal particles. However, the atomizing process is quite different, in view of the concept, from the present invention in that chemical reaction does not take place at the surface of the liquid droplets of molten metal. Also, from a technical point of view, it has not yet been known as to the effect of the chemical reaction on the surface tension at the surface of a liquid droplet.

The problem concerning the size of the particle can be solved by keeping adequate jetting conditions of the oxygen-containing gas. Referring to the condition regarding the oxidization of metal copper, while the amount of air required for oxidizing 100 gm of metal powder is about 42 liters as described above, the atomizing condition, for example, a gas velocity at a point of collision can be changed, for example, by varying the amount of air by oxygen enrichment or nitrogen addition, varying a gas volume by preheating, varying the diameter of the gas nozzle or varying the distance between the gas nozzle and the point of collision between the gas and the molten copper.

In the atomizing reaction, since a fine particle formed by atomization has an extremely large surface area, the boundary reaction proceeds within an extremely short period of time. For improving the yield of cuprous oxide, it is desirable to increase the oxygen partial pressure thereby increasing the reaction rate; but cupric oxide is formed in the course of cooling if the amount of oxygen is excessive. Accordingly, it is desired to rapidly cool the gas after the reaction and, for this purpose, it is effective to admix a previously cooled gas at a low oxygen concentration, for example, a nitrogen gas.

The temperature for the molten copper and that for the preheated gas have a direct relationship with the reaction temperature. An approximate reaction temperature can be estimated based on such temperature in that an amount of radiation heat is subtracted from the total amounts in the temperature for the molten copper plus in that for the preheated gas and the heat generated in the reaction (exothermic) of the formula (1). If the reaction temperature is higher than the melting point (1235° C.) of cuprous oxide, the resultant cuprous oxide forms liquid droplets, which are then solidified into spherical particles after cooling. Further, if the temperature is lower than the melting point, particles take an irregular form comprising agglomerates of fine solid particles. The temperature for the molten copper is defined as from the melting point (1083° C.) usually up to 1450° C. as an upper limit from a practical point of view and the range is relatively narrower. On the other hand, the preheating temperature for the oxygen-containing gas is desirably within a range from 300° C. to 1200° C., by which the reaction temperature can be controlled such that particles of cuprous oxide in a desired form can be obtained.

It is usually preferred that the molten copper is formed into a vertically downward flow under the gravitational effect; but it may be directed to a direction other than the vertical direction. For instance, if the molten copper is atomized from a horizontally directed nozzle, the reactor vessel may also be directed horizontally, by which generation of a complicate gas flow can be avoided at a bent portion between a vertical reactor vessel and a horizontal cooling chamber.

BRIEF DESCRIPTION OF THE ACCOMPANYING DRAWING

FIG. 1 is an explanatory view illustrating an example of an apparatus for producing a cuprous oxide powder used in the process according to the present invention.

DESCRIPTION OF THE PREFERRED EMBODIMENT

Figure 1:
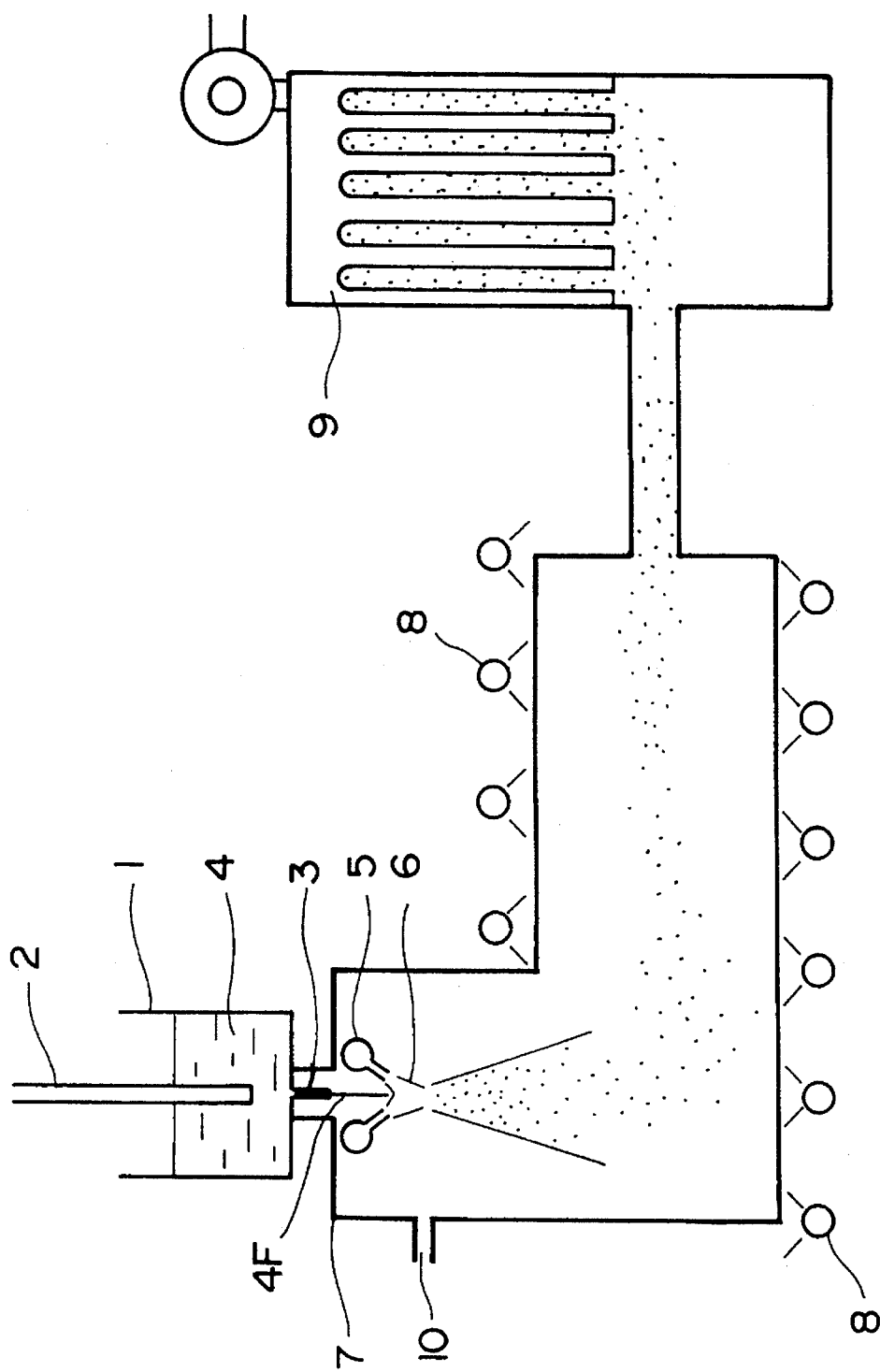

FIG. 1 is an explanatory view illustrating an example of an apparatus for producing a cuprous oxide powder used in the process according to the present invention. In the apparatus, a cylindrical reactor vessel 7 having a vertical upper portion and a horizontal lower portion is provided. A crucible 1 having a nozzle 3 formed at the bottom and being opened and closed by elevation of a stopper 2 is disposed above the reactor vessel 7 as a container for possessing the molten copper 4. The nozzle 3 faces the top of the reactor vessel 7 and gas nozzles 5 are disposed at the periphery thereof.

A gas introduction port 10 is disposed to the upper portion of the reactor vessel 7 for controlling the reaction. A plurality of water cooling nozzles 8 are disposed to the lower portion of the reactor vessel 70. A bag filter 9 is disposed subsequent to the reactor vessel 7.

Molten copper 4 is discharged from the nozzle 3 to form a downward flow 4F of the molten copper, while an oxygen-containing gas is jetted out of the gas nozzles 5. The jet streams 6 of the gas are caused to collide against the downward flow 4F of the molten copper to atomize the same. The upper portion of the reactor vessel 7 is kept at a temperature of 400° C. to 1200° C., and the molten copper is oxidized into liquid droplets or solid particles of cuprous oxide. A nitrogen gas or a gas recycled through the apparatus is blown from the gas introduction port 10, by which the gas temperature in the reactor vessel 7 can be lowered and the oxygen partial pressure can be reduced to prevent excessive oxidation of the resultant particles of cuprous oxide. The liquid droplets or solid particles of cuprous oxide are cooled and coagulated by water cooling nozzles 8 in the lower portion of the reactor vessel 7. The coagulated particles of cuprous oxide are introduced to and collected in the bag filter 9.

EXAMPLE 1

In the apparatus for producing cuprous oxide having the reactor vessel 7 of 50 cm inner diameter, 90 cm height and 140 cm horizontal length shown in FIG. 1, the temperature in the upper portion of the reactor vessel 7 was kept at 500° C. and the temperature in the lower portion was cooled with water. One kg of metal copper was heated to 1200° C. and melted in the crucible 1 and then molten copper was discharged downwardly from the nozzle 3 at 100 gm/min. Air (normal state) at 42 liters/min was preheated to 1000° C., was jetted out of four gas nozzles 5 each having an inner diameter of 0.16 cm and caused to collide against the downward flow 4F of the molten copper to atomize the copper and form particles. Nitrogen at room temperature and in an amount ten times that of the oxygen was blown from the gas introduction port 10 to cool the jetted gas at a high temperature while reducing the oxygen partial pressure. Particles cooled in the lower portion of the reactor vessel 7 were introduced into and collected in the bag filter 9.

The particles thus obtained had an average particle size of 30 μm and comprised 85% of cuprous oxide, 14% of cupric oxide and 1% of metal copper.

EXAMPLE 2

In the apparatus for producing cuprous oxide having the reactor vessel 7 of 50 cm inner diameter, 90 cm height and 140 cm horizontal length shown in FIG. 1, the temperature in the upper portion of the reactor vessel 7 was kept at 500° C. and the temperature in the lower portion was cooled with water. One kg of metal copper was heated to 1200° and melted in the crucible 1 and then molten copper was discharged downwardly from the nozzle 3 at 100 gm/min.

Air (normal state) at 42 liters/min and a nitrogen gas (normal) at 10 liters/min were mixed and preheated to 1000° C. and jetted out of four gas nozzles 5 each having an inner diameter of 0.16 cm and caused to collide against a downward flow 4F of the molten copper to atomize the copper and form particles. Nitrogen at room temperature and in an amount ten times that of the oxygen was blown from the gas introduction port 10 to cool the jetted gas at high temperature while reducing the oxygen partial pressure. Particles cooled in the lower portion of the reactor vessel 7 were introduced into and collected in the bag filter.

The particles thus obtained had an average particle size of 30 µm and comprised 93% of cuprous oxide, 5% of cupric oxide and 2% of metal copper.

EXAMPLE 3

In the apparatus for producing cuprous oxide having the reactor vessel 7 of 50 cm inner diameter, 90 cm height and 140 cm horizontal length shown in FIG. 1, the temperature in the upper portion of the reactor vessel 7 was kept at 500° C. and the temperature in the lower portion was cooled with water. One kg of the metal copper was heated to 1200° C. and melted in the crucible 1 and then the molten copper was discharged downwardly from the nozzle 3 at 100 gm/min. Air (normal state) at 42 liters/min and a nitrogen gas (normal state) at 20 liters/min were mixed and preheated to 1000° C. and jetted out of four gas nozzles 5, each having an inner diameter of 0.16 cm and caused to collide against a downward stream 4F of the molten copper to atomize the copper and form particles. Particles cooled in the lower portion of the reactor vessel 7 were introduced into and collected in the bag filter 9.

The thus obtained particles had an average particle size of 25 µm.

As has been described above, according to the process for producing a cuprous oxide powder of the present invention, a cuprous oxide powder suitable for an antifouling pigment can be produced, without requiring a large-scale production facility, in simple steps, and efficiently and continuously.

What is claimed is:

1. A process for producing a cuprous oxide powder comprising the steps of:

discharging a molten copper, which is kept at a temperature at or higher than the melting point and at or lower than 1450° C. and contained in a container having a nozzle disposed at a bottom, from the nozzle into a reactor vessel disposed below the container to form a downward flow of the molten copper;

atomizing the downward flow of the molten copper by a jet stream of an oxygen-contained gas to produce fine liquid droplets or fine particles and, thereby simultaneously, oxidizing the fine liquid droplets or fine particles having a large surface area for oxidization to form cuprous oxide;

cooling the liquid droplets or solid particles of the thus formed cuprous oxide; and then collecting the liquid droplets or the solid particles from the reactor vessel.

2. The process as defined in claim 1 wherein the molten copper is discharged from the nozzle to a direction other than the vertical direction to form a downward flow of the molten copper.

3. The process as defined in claim 1 further comprising the step of:

preheating the oxygen-contained gas to a temperature between 300° C. and 1200° C.

4. The process as defined in claim 1 further comprising the steps of:

disposing a gas introduction port in the reactor vessel, supplying an inert gas containing nitrogen from the gas introduction port to rapidly cool the liquid droplets or solid particles of the thus formed cuprous oxide, and lowering the oxygen partial pressure to prevent excess oxidation to cupric oxide.

5. The process as defined in claim 1 wherein the size of the fine liquid droplets or fine particles is less than about 30 µm.

\* \* \* \* \*